(12) United States Patent
Wolff

(10) Patent No.: US 10,433,014 B2
(45) Date of Patent: Oct. 1, 2019

(54) MEDIA CONTENT DOWNLOAD TIME

(71) Applicant: HEWLETT PACKARD ENTERPRISE DEVELOPMENT LP, Houston, TX (US)

(72) Inventor: Steven Michael Wolff, Loveland, OH (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/500,041

(22) PCT Filed: Oct. 28, 2014

(86) PCT No.: PCT/US2014/062603
§ 371 (c)(1),
(2) Date: Jan. 28, 2017

(87) PCT Pub. No.: WO2016/068873
PCT Pub. Date: May 6, 2016

(65) Prior Publication Data
US 2017/0245013 A1    Aug. 24, 2017

(51) Int. Cl.
*H04N 21/466* (2011.01)
*H04N 21/4147* (2011.01)
(Continued)

(52) U.S. Cl.
CPC ..... *H04N 21/4667* (2013.01); *H04N 21/4147* (2013.01); *H04N 21/4312* (2013.01); *H04N 21/4334* (2013.01); *H04N 21/44204* (2013.01); *H04N 21/44209* (2013.01); *H04N 21/44222* (2013.01); *H04N 21/458* (2013.01); *H04N 21/4621* (2013.01); *H04N 21/4662* (2013.01);
(Continued)

(58) Field of Classification Search
CPC ........... H04N 21/4667; H04N 21/4312; H04N 21/44204; H04N 21/44209; H04N 21/44222; H04N 21/458; H04N 21/4621; H04N 21/8456; H04N 21/4147; H04N 21/4334; H04N 21/4662; H04N 21/238
See application file for complete search history.

(56) References Cited

U.S. PATENT DOCUMENTS 6,195,680 B1   2/2001  Goldszmidt
6,219,704 B1   4/2001  Kim et al.
(Continued)

OTHER PUBLICATIONS

International Searching Authority, "Notification of Transmittal of the International Search Report and the Written Opinion", PCT/US2014/062603, dated Jun. 29, 2015, 12 pages.
(Continued)

*Primary Examiner* — John R Schnurr
(74) *Attorney, Agent, or Firm* — Tarolli, Sundheim, Covell & Tummino L.L.P.

(57) ABSTRACT

A system can include a memory to store machine readable instructions. The system can also include a processing unit to access the memory and execute the machine readable instructions. The machine readable instructions can include a scheduling agent that can determine a download time for selected media content from a content provider. The download time can be based on a viewing time and a monitored network usage pattern over an extended period of time at the system.

18 Claims, 4 Drawing Sheets

(51) Int. Cl.
*H04N 21/431* (2011.01)
*H04N 21/433* (2011.01)
*H04N 21/442* (2011.01)
*H04N 21/458* (2011.01)
*H04N 21/462* (2011.01)
*H04N 21/845* (2011.01)
*H04N 21/238* (2011.01)

(52) U.S. Cl.
CPC ....... *H04N 21/8456* (2013.01); *H04N 21/238* (2013.01)

(56) References Cited

U.S. PATENT DOCUMENTS

| | | | | |
|---|---|---|---|---|
| 6,725,460 | B1* | 4/2004 | Nishiyama | H04N 7/17336 348/722 |
| 6,766,376 | B2 | 7/2004 | Price | |
| 7,698,720 | B2 | 4/2010 | Matz | |
| 7,725,557 | B2 | 5/2010 | Klemets et al. | |
| 8,291,461 | B2* | 10/2012 | Thomas | G06F 3/0481 725/105 |
| 2002/0161913 | A1* | 10/2002 | Gonzalez | H04L 29/06 709/233 |
| 2003/0069964 | A1* | 4/2003 | Shteyn | H04L 29/06 709/225 |
| 2005/0071882 | A1* | 3/2005 | Rodriguez | H04H 20/10 725/95 |
| 2006/0294555 | A1* | 12/2006 | Xie | H04N 7/17318 725/88 |
| 2008/0134043 | A1 | 6/2008 | Georgis et al. | |
| 2008/0229372 | A1* | 9/2008 | White | H04N 7/17336 725/91 |
| 2008/0273591 | A1* | 11/2008 | Brooks | H04N 7/1675 375/240.01 |
| 2010/0205318 | A1 | 8/2010 | Melnyk et al. | |
| 2011/0251987 | A1 | 10/2011 | Buchheit | |
| 2011/0299544 | A1* | 12/2011 | Lundgren | G06Q 20/10 370/401 |
| 2013/0007263 | A1* | 1/2013 | Soroushian | H04L 47/12 709/224 |
| 2014/0189771 | A1 | 7/2014 | Park et al. | |
| 2014/0201334 | A1 | 7/2014 | Wang et al. | |
| 2014/0215085 | A1 | 7/2014 | Li et al. | |
| 2014/0337875 | A1* | 11/2014 | Dankberg | H04N 21/4784 725/23 |

OTHER PUBLICATIONS

Kusmierek, et al. "Streaming Video Delivery Over Internet with Adaptive End-to-End QoS", The Journal of Systems and Software, Elsevier, Mar. 2005. vol. 75, No. 3, 16 pages.

* cited by examiner

MEDIA CONTENT DOWNLOAD TIME

BACKGROUND

A digital video recorder (DVR), sometimes referred to as a personal video recorder (PVR), is a consumer electronics device or application software that records video in a digital format to a hard disk drive, a universal serial bus (USB) flash drive, a secure digital (SD) memory card, a solid state drive or other local or networked mass storage device. For example, a DVR can be implemented as a set-top box (STB) with recording facility, a portable media player (PMP) with recording capability, a portable media recorder (PMR) such as a camcorder and software for a personal computer which enables video capture and playback. In some examples, televisions can have DVR capabilities built-in.

DETAILED DESCRIPTION

Example systems and methods for downloading media content from a content provider are described herein. The media content (e.g., an audio-video file) can be selected, for example, at a content consumer that communicates with the content provider via a network. A viewing time (a time in the future) for the selected media content can also be selected. The content consumer can monitor a network usage pattern over an extended period of time (e.g., hours, days, a week or more, etc.) and employ learning techniques to determine a download time for the selected media content based on the viewing time and the monitored network usage pattern. At the download time, a download of the selected media content can be initiated. Employment of the systems and methods of this disclosure allows playback of the selected media content at the viewing time without unwanted interruption (e.g., buffering) due to limited network bandwidth.

Figure 1:
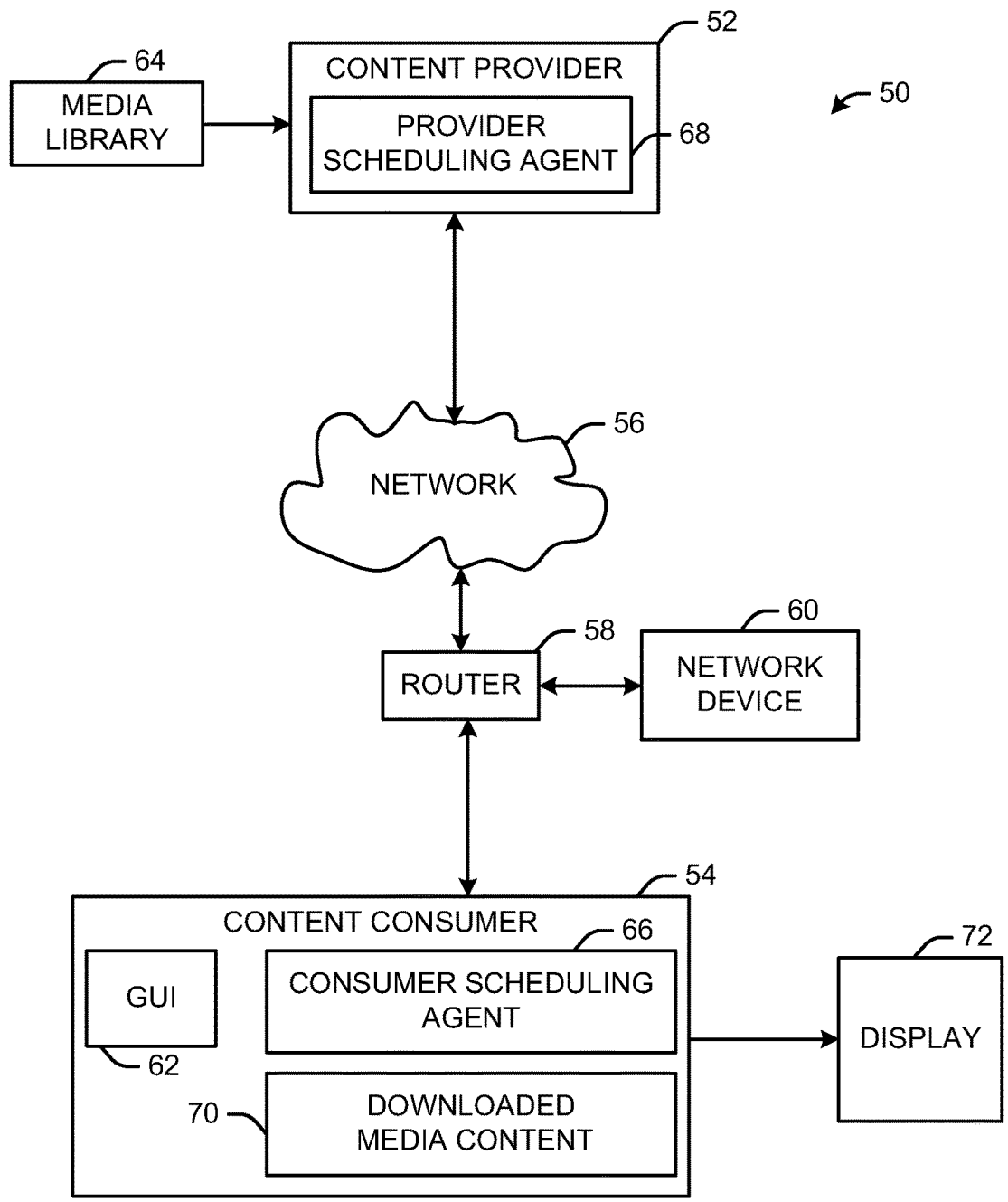
FIG. 1 illustrates an example of a system to download selected media content.

FIG. 1 illustrates an example of a system 50 that could be employed to download media content. The media content could be, for example, video and/or audio files, such as Motion Pictures Experts Group-4 (MP4) files or files in another file format. The system 50 can include a content provider 52, such as a video service and/or an audio service. In some examples, the content provider 52 can be configured to provide full-length feature movies and/or episodes of television programs upon request. In some situations, the media content can be stored as standard definition content, high definition (HD) content, ultra-high definition (UHD) content, which is also known as "4K" media content and quad ultra-high definition (QUHD) content, which is also known as "8K" media content, etc. The content provider 52 can be implemented, for example, as a server, such as a cloud server or as a single instance of a computing device.

The system 50 can also include a content consumer 54 that can be programmed to communicate with the content provider 52 via a network 56. In some examples, communications between the content consumer 54 and the content provider 52 can flow through a router 58, such as a home network router. In such a situation, there can be a network device 60 (e.g., another computing device) that can be concurrently coupled to the router 58. The network 56 could be implemented, for example, as a public network, such as the Internet, a private network or a combination thereof. In some examples, the content consumer 54 can be implemented as a set-top box (STB) for a television, an application executing on a device (e.g., a smartphone, a tablet computer, a laptop computer, a smart television, etc.). The content consumer 54 can be implemented, for example, as a digital video recorder (DVR).

The content consumer 54 can provide a user with a graphical user interface (GUI) 62 that can allow the user to select media content stored in a media library 64 accessible by the content provider 52. In some examples, the GUI 62 can also allow the user to select a time and date for viewing the selected media content, which time and date can collectively be referred to as a viewing time for the selected media content. The viewing time could be, for example, a time in the future at which a user desires to have the selected media content made available. For instance, the viewing time could be several hours or days into the future.

The media library 64 could be, for example, a database or other data archive. In many situations, such as situations where the selected media content includes HD, 4K or 8K content, the available bandwidth between the content provider 52 and the content consumer 54 is such that the selected media content may not be streamed in real-time. In many situations, if attempts are made to stream and output the selected media in real-time, an excessive amount of lag and/or buffering can ensue, thereby causing a sub-standard user experience.

To overcome bandwidth limitations, the system 50 can include a scheduling agent. In some examples, the scheduling agent can be implemented as a client-side application executing on the content consumer 54, which application can be referred to as a consumer scheduling agent 66. In other examples, the scheduling agent can be implemented as a server-side application executing on the content provider 52, which application can be referred to as a provider scheduling agent 68. In still other examples, the provider scheduling agent 68 and the consumer scheduling agent 66 can operate in concert to form different components of the scheduling agent.

In an example where the scheduling agent is implemented as an application executing on the content consumer 54, the consumer scheduling agent 66 can monitor a network usage pattern between the content consumer 54 and the content provider 52 over an extended period of time. The extended period of time may be at least one hour, and may include a number of hours, days, a week (e.g., a 7 day calendar week, a 5 day business week, etc.) or more. The network usage pattern can include, but is not limited to network usage on a home network (the network downstream from the router 58). The download time can be prior to the viewing time. Moreover, the consumer scheduling agent 66 can monitor available network bandwidth between the content provider 52 and the content consumer 54 to estimate an amount of time needed to download the selected media content. The consumer scheduling agent 66 can employ a learning algorithm based on the monitored usage pattern, the available bandwidth and the viewing time to determine a download time to download the selected media content. The learning algorithm could be implemented, for example, as a rule based logic system, a neural network, a statistical classifier, a naïve Bayesian network, etc. In other examples, the learning algorithm can employ multi-linear regression, non-linear regression, ensemble learning (e.g., Forest Guide) methods, etc. For example, the download time could be off-peak hours, such as the hours between 1:00 a.m. and 5:00 a.m. Monday morning. Thus, at the download time, the content consumer 54 can download the selected media content from the content provider 52 and store downloaded media content 70 on in a non-transitory memory, such as a hard disk drive, flash drive, a solid state drive, etc.

In situations where the scheduling agent is implemented as a provider scheduling agent 68, a network usage pattern at the content provider 52 and network usage pattern between the content provider 52 and the content consumer 54 can be continuously or intermittently monitored by the provider scheduling agent 68 over an extended period of time. The extended period of time may be at least one hour, and may include a number of hours, days, a week (e.g., a 7 day calendar week, a 5 day business week, etc.) or more. Additionally, the provider scheduling agent 68 can estimate an available bandwidth between the content provider 52 and the content consumer 54, which can be employed to determine the amount of time needed to download the selected media content. The provider scheduling agent 68 can employ a learning algorithm that can determine a download time for the selected media content based on the monitored network usage pattern, the estimated available bandwidth and the viewing time provided from the content consumer 54. In some examples, the learning algorithm could be implemented, for example, as a rule based logic system, a neural network, a statistical classifier, a naïve Bayesian network, etc. In other examples, the learning algorithm can employ multi-linear regression, non-linear regression, ensemble learning (e.g., Forest Guide) methods, etc. At the determined download time, the selected media content can be output to the content provider 52 and such that the content provider 52 can store the downloaded media content 70.

In situations where the scheduling agent includes both the provider scheduling agent 68 and the consumer scheduling agent 66, the network usage pattern at both the content provider 52 and the content consumer 54, as well as the network usage pattern between the content provider 52 and the content consumer 54 can be monitored. In this situation, an algorithm operating at the provider scheduling agent 68 and/or the consumer scheduling agent 66 can determine the download time for the selected media content based on the monitored network usage pattern at the content provider 52, the content consumer 54 and the network usage pattern between the content provider 52 and the content consumer 54 as well as the viewing time and available bandwidth between the content provider 52 and the content consumer 54. Such an algorithm can be a learning algorithm that can operate in a similar or different manner than the learning algorithm discussed with respect to the provider scheduling agent 68 and the consumer scheduling agent 66.

Moreover in some situations, it may be possible that not all of the selected media content can be downloaded in a single session. In such a situation, the provider scheduling agent 68 and/or the consumer scheduling agent 66 can employ the learning algorithm to schedule multiple download times, wherein during each of the multiple download times, a download session is commenced and a portion of the selected media content is downloaded to the content consumer 54.

In some examples, the downloaded media content 70 can include digital rights management (DRM) features that can control the usage of the downloaded media content 70. Such DRM features could prevent the downloaded media content 70 from being copied onto another device and/or restrict a time of playback of the downloaded media content 70. Inclusion of such DRM features can ensure that the rights of the downloaded media content 70 are preserved, and that otherwise unlawful distribution (e.g., piracy) of the downloaded media content 70 is prevented.

At the viewing time or some other time after the download of the selected media content has been completed, the user of the content consumer 54 can employ the GUI 62 to select a playing of the downloaded media content 70. The downloaded media content 70 can be output at a display 72 coupled to the content consumer 54. By employing this system 50, the downloaded media content 70 can be viewed in a manner that will provide a satisfactory user experience. In particular, in situations where bandwidth is limited, the entirety of the selected media content can be downloaded prior to the commencement of outputting the selected media content at the display 72, thereby avoiding interruptions and/or disturbances during a playback session such as buffering and/or lowering of image quality during the playback session.

Figure 2:
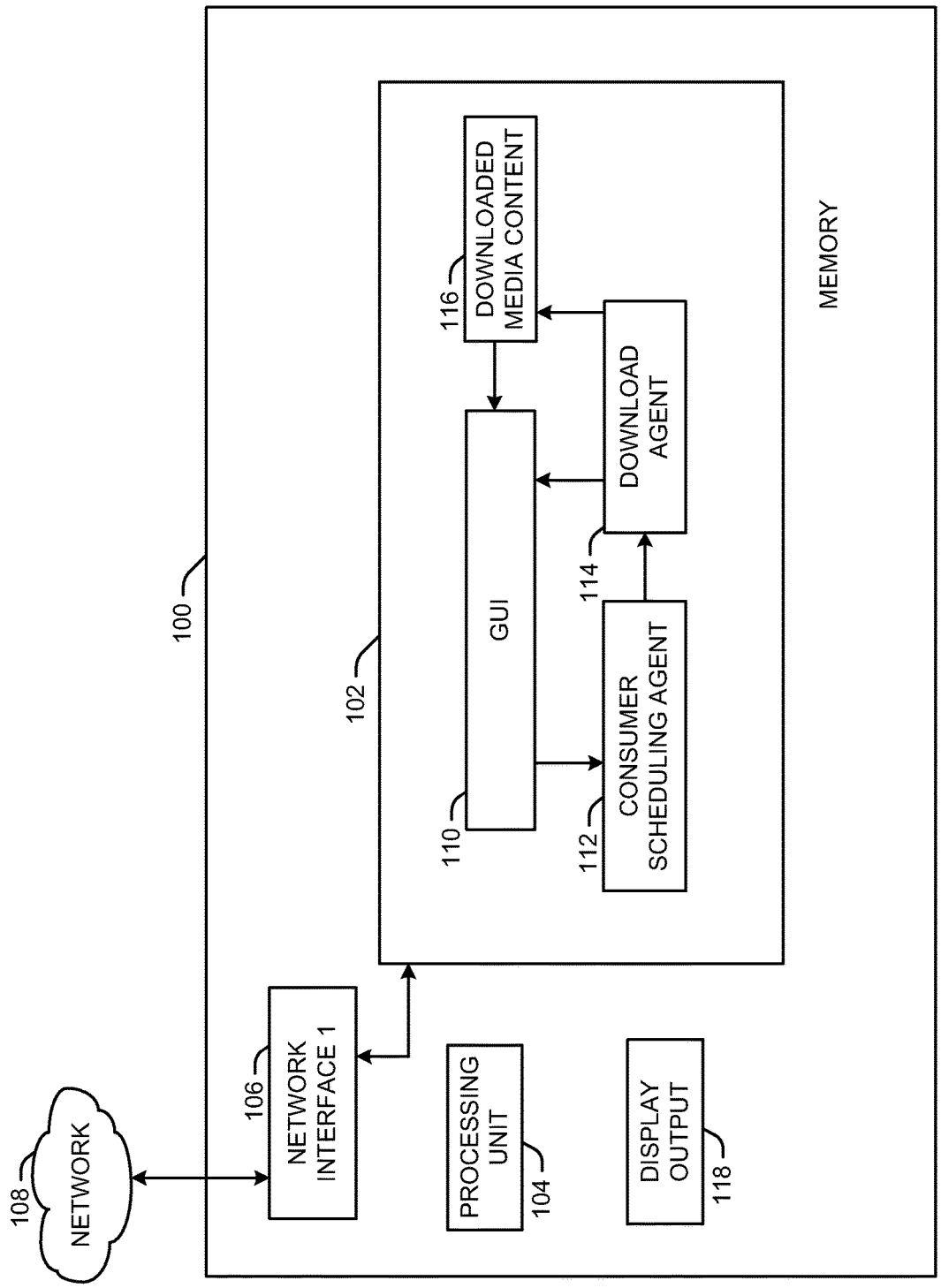
FIG. 2 illustrates an example of a content consumer to download selected media content.

FIG. 2 illustrates an example of a content consumer 100 that could be employed, for example, to implement the content consumer 54 illustrated in FIG. 1. The content consumer 100 can include a memory 102 that can store machine readable instructions. The memory 102 could be implemented, for example, as non-transitory computer readable media, such as volatile memory (e.g., random access memory), nonvolatile memory (e.g., a hard disk drive, a solid state drive, flash memory, etc.) or a combination thereof. The content consumer 100 can also include a processing unit 104 to access the memory 102 and execute the machine-readable instructions. The processing unit 104 can include, for example, one or more processor cores. The content consumer 100 can include a network interface 106 configured to communicate with a network 108. The network interface 106 could be implemented, for example, as a network interface card. The network 108 could be implemented for example, as a public network (e.g., the Internet), a private network (e.g., a carrier network) or combination thereof (e.g., a virtual private network).

The memory 102 can include, for example, a GUI 110 that can receive data via the network 108 that characterizes a media library stored at a content provider. Media content can be selected from the media library by employment of the GUI 110. To select the media content, the media library could be searched, for example, by using criteria such as title, genre, release date, included actors, etc. Additionally, the GUI 110 can be employed to enter a viewing time that characterizes a date and time of day that the selected media should be made available to users. The content provider can provide a consumer scheduling agent 112 that is stored in the memory 102 of the content provider with metadata that characterizes the selected media content. Such metadata can include, for example, a file size of the selected media content, a resolution of the selected media content, etc.

The GUI 110 can also set download parameters based on user input. The download parameters could be, for example, time restraints for downloading the selected media content. For instance, in some situations, during certain times of the day, different data rate fees may apply. In such a situation, setting the time constraints for the download parameters can ensure that the selected media is downloaded at times specified by a user (e.g., times when the lowest data rate applies). In some examples, other parameters such as maximum download size can additionally or alternatively be included in the download parameters.

The consumer scheduling agent 112 can continuously or intermittently monitor a network usage pattern on the network 108 over an extended period of time. The extended period of time may be at least one hour, and may include a number of hours, days, a week (e.g., a 7 day calendar week, a 5 day business week, etc.) or more. The network usage pattern can include, but is not limited to network usage on a home network (the network downstream from a router). Additionally, the consumer scheduling agent 112 can monitor available bandwidth between the content consumer 100 and the content provider. The consumer scheduling agent 112 can determine a download time for the selected media content based on the monitored network usage pattern, the viewing time of the selected media content, the download parameters, the available bandwidth as well as the metadata for the selected media content. To determine the download time, the consumer scheduling agent 112 could employ, for example, a learning algorithm. In some examples, the learning algorithm can be implemented to include any of the learning algorithm techniques described herein. Additionally, in some situations, the consumer scheduling agent 112 may determine that multiple download sessions are needed to download the selected media content. In such a situation, the consumer scheduling agent 112 can determine a plurality of download times.

The download time can be provided to a download agent 114 stored in the memory 102. The consumer scheduling agent 112 can be programmed such that at the download time (or at a first download time of a plurality of download times) the download agent 114 can request the selected media content from the content provider. The content provider can provide the selected media content in response to the request. The received selected media content can be stored as downloaded media content 116 in the memory 102. Moreover, in situations where multiple download sessions are needed, the download agent 114 can download a portion of the selected media content at each of the plurality of download times.

The operation of the content consumer 100 may be better understood with reference to examples. In a first example (hereinafter, "the first example"), the GUI 110 can be employed to select a movie (e.g., the selected media content), entitled "First Example Movie" from the content library of the content provider with a viewing time of 6:30 p.m. on (Saturday) 25 Oct. 2014. Moreover, the time and date of the selection of the First Example movie can be (Tuesday) 21 Oct. 2014. The content provider can also provide metadata for the First Example Movie that indicates the First Example Movie is about 25 Gigabytes (GB) and has a resolution of 1920×1080 with progressive scan (referred to as "1080p").

In the first example, the consumer scheduling agent 112 can evaluate a monitored network usage pattern, the viewing time, the download parameters and the metadata for the First Example Movie to determine the download time. In the first example, it can be presumed that the network usage pattern indicates that there is relatively low network activity from 8:30 a.m. to 4:30 p.m., and from 11:30 p.m. to 6:30 a.m. Monday to Friday, as well as 1:00 a.m. to 9:30 a.m. Saturday and Sunday with peak usage time between the hours of 5:30 p.m. and 10:30 p.m. Sunday to Saturday. Thus, the consumer scheduling agent 112 can determine that the download time should not be during the peak usage time, but instead during a time of relatively low network usage. As used herein, the term "relatively low network usage" is a time during which the network usage is less than 50% of network usage as compared to a peak network usage time identified in the network usage pattern. Additionally, the consumer scheduling agent 112 can determine a bandwidth available between the content provider and the content consumer 100. In the first example, it can be presumed that the content consumer 100 can receive content from the content provider at a rate of about 10 megabits per second (Mbps) or about 1.25 Megabytes per second (MB/s). Thus, the consumer scheduling agent 112 can estimate that the download time for the First Example Movie is about 5.55 hours.

Therefore, in the first example, the consumer scheduling agent 112 can select a download time of 22 Oct. 2014 at 8:45 a.m., wherein an estimated completed time can be about 2:20 p.m. The download time can be provided to the download agent 114. At the download time (22 Oct. 2014 at 8:45 a.m.), the download agent 114 can request the First Example Movie from the content provider. The download agent 114 can initiate a download session and receive the First Example Movie and store the First Example Movie as the downloaded media content 116 and complete the download sometime around 22 Oct. 2014 at 2:20 p.m.

In a second example, (hereinafter, "the second example"), the GUI 110 can be employed to select a movie (e.g., the selected media content), entitled "Second Example Movie" from the content library of the content provider with a viewing time of 8:30 p.m. on (Thursday) 23 Oct. 2014. Moreover, the time and date of the selection of the Second Example Movie can be 3:00 p.m. on 17 Oct. 2014. The content provider can also provide metadata for the Second Example Movie that indicates the Second Example Movie is about 160 Gigabytes (GB) and has a resolution of 4096× 2160 with progressive scan (referred to as "4K").

In the second example, the consumer scheduling agent 112 can evaluate a monitored network usage pattern, the download parameters, the viewing time, the available bandwidth and the metadata for the Second Example Movie to determine the download time. In the second example, it can be presumed that the network usage pattern indicates that there is relatively low network usage from 11:30 p.m. to 6:30 a.m. Sunday-Thursday, as well as 1:00 a.m. to 9:30 a.m. Friday and Saturday with peak usage time between the hours of 5:30 p.m. and 10:30 p.m. Sunday to Saturday and moderate usage from 6:30 a.m. to 5:30 p.m. Thus, the consumer scheduling agent 112 can determine that the download time should not be during the peak usage time or the moderate time, but instead during the time of relatively low network usage. Additionally, the consumer scheduling agent 112 can determine that the content consumer 100 can receive content from the content provider at a rate of about 20 megabits per second (Mbps) or about 2.5 Megabytes per second (MB/s). Thus, the consumer scheduling agent 112 can estimate that the download time for the Second Example Movie is about 17.8 hours.

In the second example, the consumer scheduling agent 112 can determine that no single time slot of low network usage is available to download the entirety of the Second Example Movie. Thus, in the second example, the consumer scheduling agent 112 can select multiple download times. In particular, a first download time for the Second Example Movie can be scheduled at 1:30 a.m. on 18 Oct. 2014 until 9:00 a.m. 18 Oct. 2014. Additionally, a second download time for the Second Example Movie can be scheduled at 1:30 a.m. on 19 Oct. 2014 until 9:00 a.m. 19 Oct. 2014. Moreover, a third download time for the Second Example Movie can be scheduled at 12:00 a.m. on 20 Oct. 2014 until 6:00 a.m. 20 Oct. 2014. The first, second and third download times can be provided to the download agent 114.

At the first download time (1:30 a.m. on 18 Oct. 2014), the download agent 114 can request the Second Example Movie from the content provider. The download agent 114 can initiate a first download session and receive a first portion of the Second Example Movie and store the first portion of the Second Example Movie as the downloaded media content 116. The first download session can continue until 9:00 a.m. on 18 Oct. 2014. Similarly, at the second download time (1:30 a.m. on 19 Oct. 2014), the download agent 114 can initiate a second download session and receive a second portion of the Second Example Movie and store the second portion of the Second Example Movie as the downloaded media content 116. The second download session can continue until 9:00 a.m. on 19 Oct. 2014. Further, at the third download time (12:00 a.m. on 20 Oct. 2014), the download agent 114 can initiate a third download session and receive a third portion of the Second Example Movie and store the third portion of the Second Example Movie as the downloaded media content 116. The first, second and third portions of the downloaded media content 116 can form the entirety of the Second Example Movie.

In a third example (hereinafter, "the third example"), the GUI 110 can be employed to select a movie (e.g., the pre-selected media content), entitled "Third Example Movie" from the content library of the content provider with a viewing time of 6:30 p.m. on (Saturday) 25 Oct. 2014. Moreover, the time and date of the selection of the Third Example Movie can be (Tuesday) 21 Oct. 2014. The content provider can also provide metadata for the Third Example Movie that indicates the Third Example Movie is about 25 Gigabytes (GB) and has a resolution of 1920×1080 with progressive scan (referred to as "1080p").

In the third example, the consumer scheduling agent 112 can evaluate a monitored network usage pattern, the download parameters, the viewing time and the metadata for the Third Example Movie to determine the download time. In the third example, it can be presumed that the network usage pattern indicates that there is relatively low network activity from 8:30 a.m. to 4:30 p.m., and from 11:30 p.m. to 6:30 a.m. Monday-Friday, as well as 1:00 a.m. to 9:30 a.m. Saturday and Sunday with peak usage time between the hours of 5:30 p.m. and 10:30 p.m. Sunday to Saturday. Thus, the consumer scheduling agent 112 can determine that the download time should not be during the peak usage time, but instead during a time of relatively low network usage. Moreover, the download parameters can include a time constraint that prohibits downloading from 5:00 p.m. until 12:00 a.m. every day of the week. Additionally, the network usage pattern can indicate a bandwidth available to the content consumer 100. In the first example, it can be presumed that the content consumer 100 can receive content from the content provider at a rate of about 10 megabits per second (Mbps) or about 1.25 Megabytes per second (MB/s). Thus, the consumer scheduling agent 112 can estimate that the download time for the Third Example Movie is about 5.55 hours.

Therefore, in the third example, the consumer scheduling agent 112 can select a download time of 22 Oct. 2014 at 8:45 a.m., wherein an estimated completed time can be about 2:20 p.m. The download time can be provided to the download agent 114. At the download time (22 Oct. 2014 at 8:45), the download agent 114 can request the Third Example Movie from the content provider. The download agent 114 can initiate a download session and receive the Third Example Movie and store the Third Example Movie as the downloaded media content 116. However, in the third example, there can be an unexpected network event that can prevent completing the download of the Third Example Movie during the time of low network usage (which would end at 4:30 p.m. on 22 Oct. 2014). The unexpected network event could be, for example, a network outage, increased network traffic, a loss of network bandwidth, etc. or a combination of multiple unexpected network events. In such a situation, at the end of low network usage time, the download agent 114 can provide a message to the consumer scheduling agent 112 indicating that the download of the Third Example Movie is not completed. Moreover, download agent 114 can provide the consumer scheduling agent 112 with data that indicates which portion of the Third Example Movie that has been downloaded, such that the consumer scheduling agent 112 can determine the portion of the Third Example Movie that has not been download.

In the third example, the consumer scheduling agent 112 can determine another download time for the Third Example Movie. In the third example, it is presumed that the other download time is 12:00 a.m. on 23 Oct. 2014 until 6:00 a.m. 23 Oct. 2014. Thus, at the other download time, the download agent 114 can initiate another download session to download the portion of the Third Example Movie that has not yet been downloaded. In the third Example, it is presumed that the download agent 114 completes the download of the Third Example Movie by 2:00 a.m. on 23 Oct. 2014.

Upon storing the downloaded media content 116, the GUI 110 can be employed to select a playback of the downloaded media content 116. The playback of the downloaded media content 116 can commence once the downloaded media content 116 is stored. In some situations, the playback can commence prior to the scheduled viewing time for the selected media content, provided that the downloading of the selected media content is complete. The downloaded content can be output to a display via a display output 118. The display output 118 could be a standard video output connection, such as a High-Definition Multimedia Interface (HDMI), Digital Visual Interface (DVI) output, a component video output, etc. In some examples, the GUI 110 can provide an interface for accessing the content consumer 100 from an external device. For instance, as noted, the content consumer 100 can be implemented as a stand-alone device, such as a set-top box. In such a situation, an external device can request the downloaded media content 116 from the content consumer 100. The external device could be, for example, a tablet computer, a laptop computer, a desktop computer, a smart phone, a personal digital assistant, etc. In this situation, the GUI 110 can stream the downloaded media content 116 to the external device via the network (e.g., a local area network, such as a home network). The external device can initiate the playback of the downloaded media content 116. In some examples, the downloaded media content 116 can include DRM features that can control the usage of the downloaded media content 116. Such DRM features could prevent the downloaded media content 116 from being copied onto another device and/or restrict a time of playback of the downloaded media content 116.

By employing the content consumer 100 to download the selected media content prior to initiating a playback, a user watching the playback can receive a high quality, uninterrupted program. As the resolution of media content increases (e.g., to HD, 4K and 8K) typical broadband network speeds are unable to stream content in real-time without sacrificing quality.

Figure 3:
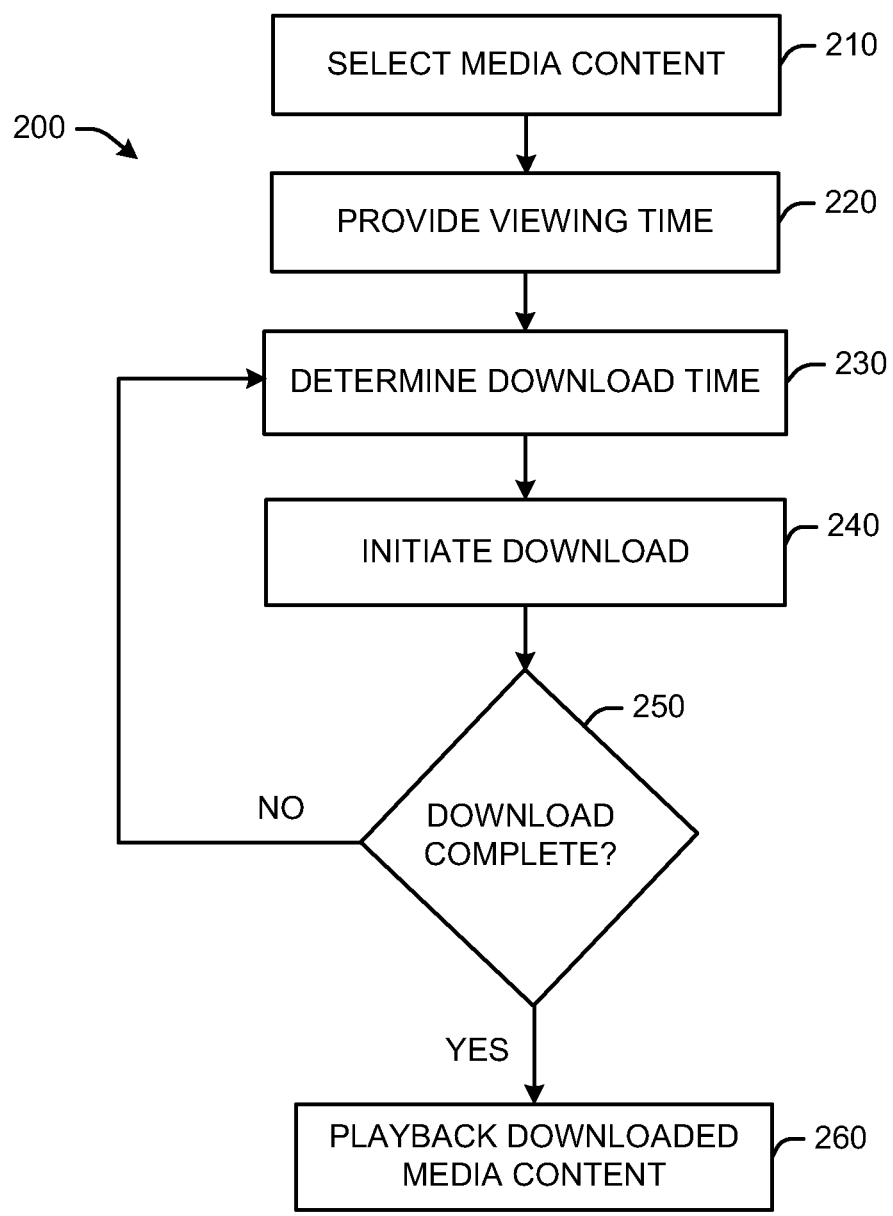
FIG. 3 illustrates a flowchart of an example method for downloading selected media content.
Figure 5:
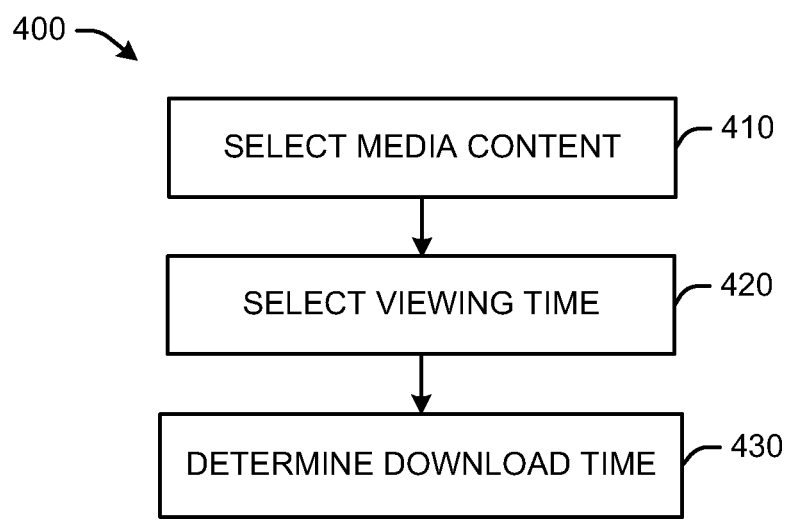
FIG. 5 illustrates a flowchart of an example method for determining a download time for selected media content.

In view of the foregoing structural and functional features described above, example methods will be better appreciated with reference to FIGS. 3 and 5. While, for purposes of simplicity of explanation, the example methods of FIGS. 3 and 5 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method. The example methods of FIGS. 3 and 5 can be implemented as instructions stored in a non-transitory machine-readable medium. The instructions can be accessed by a processing resource (e.g., one or more processor cores) and executed to perform the methods disclosed herein.

FIG. 3 illustrates an example flowchart of a method 200 for downloading media at a content consumer. The method 200 could be implemented, for example, by the system 50 illustrated in FIG. 1 and/or the content consumer 100 illustrated in FIG. 2. At 210, media can be selected (e.g., by the content consumer) from a media library on a content provider (e.g., the content provider 52 of FIG. 1). The content provider and the content consumer can communicate via a network. At 220, a viewing time (a selected date and time) that a user desires to view the selected media can be provided.

At 230, a download time can be determined by the content consumer, the content provider or a combination of the content consumer and the content provider. The download time can be based, for example, on metadata related to the selected media content, as well as a network usage pattern over an extended period of time, including an available bandwidth between the content provider and the content consumer. The extended period of time may be at least one hour, and may include a number of hours, days, a week (e.g., a 7 day calendar week, a 5 day business week, etc.) or more. At 240, a download of the selected media content can be initiated by the content consumer that can continue for a predetermined amount of time and/or until the entirety of the selected media content is downloaded. At 250, the content consumer can determine whether the download is complete. If the determination at 250 is negative (e.g., NO), the method 200 can return to 230. If the determination is 250 is positive (e.g., YES), the method 200 can proceed to 260. At 260, the content provider can playback the downloaded media content. The playback can include outputting the downloaded media content on a display and/or streaming the downloaded media content.

Figure 4:
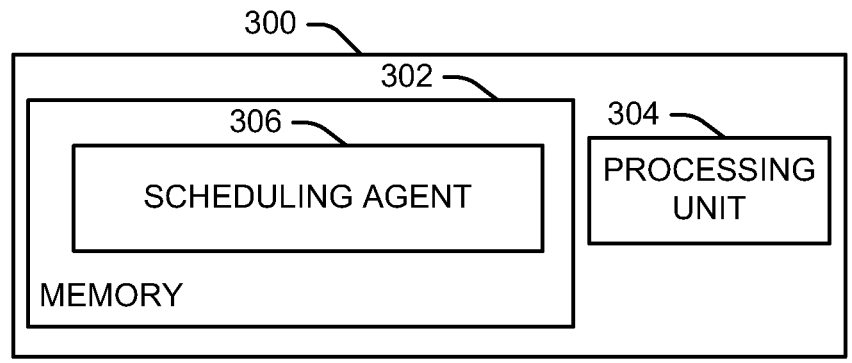
FIG. 4 illustrates an example of a system that can determine a download time for selected media content.

FIG. 4 illustrates an example of a system 300 that can be employed to implement the content provider 52 and/or the content consumer 54 illustrated in FIG. 1. The system 300 can include a memory 302 to store machine readable instructions. The system 304 can also include a processing unit to access the memory and execute the machine readable instructions. The machine readable instructions can include a scheduling agent 306 to determine a download time for selected media content from a content provider. The download time can be based on a viewing time and a monitored network usage pattern over an extended period of time at the system.

FIG. 5 illustrates a flowchart of an example method 400 to determine a download time for selected media content. The method 400 could be implemented, for example, by the content consumer 54 illustrated in FIG. 1 and/or the content consumer 100 illustrated in FIG. 2. At 410, media content for download from a content provider can be selected (e.g., by the GUI 110 illustrated in FIG. 2). At 420, a viewing time for the selected media content can be selected (e.g., by the GUI). At 430, a download time for the selected media content can be determined (e.g., by the consumer scheduling agent 112 of FIG. 2) based on a monitored network usage pattern over an extended period of time and the selected viewing time.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processors of a general purpose computer, special purpose computer, or other programmable data processing apparatus (or a combination of devices and circuits) to produce a machine, such that the instructions, which execute via the one or more processors, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A system comprising:
a memory to store machine readable instructions; and
a processing unit to access the memory, and execute the machine readable instructions, the machine readable instructions comprising:
a scheduling agent to continuously monitor a consumer network usage pattern on a network at a consumer device for downloading selected media content and continuously monitor a provider network usage pattern on a network at the content provider to determine a download time for selected media content from a content provider, wherein the download time is determined by machine learning based on:
a viewing time of the selected media content;
an amount of network bandwidth available to a consumer device for downloading the selected media content;
a provider network usage pattern; and
a consumer network usage pattern; and
a download agent to initiate a download of the selected media content at the determined download time, wherein the selected media content contains digital rights management features.

2. The system of claim 1, wherein the download time is also determined based on metadata that characterizes a size of the selected media content.

3. The system of claim 1, wherein the consumer network usage pattern indicates that the download time has an expected relatively low network usage.

4. The system of claim 3, wherein the continuously monitored network usage pattern comprises a peak activity of the home network.

5. The system of claim 4, wherein the expected relatively low network usage represents a network traffic amount that is less than fifty percent of the peak activity.

6. The system of claim 1, wherein the download time is at least 24 hours later than a time at which the selected media content is selected.

7. The system of claim 1, further comprising a graphical user interface to select the selected media content from a media library at the content provider.

8. The system of claim 1, wherein the download time is determined based on a download parameter that includes a time constraint based on user input for the download time.

9. The system of claim 1, wherein the download time comprises a plurality of download times.

10. The system of claim 1, further comprising a display output to output the selected media content in response to user input.

11. The system of claim 1, wherein the consumer network usage pattern is continuously monitored over an extended period of time comprising at least 120 hours.

12. A method comprising:
receiving selected media content for download from a content provider;
receiving a selected viewing time for the selected media content;
continuously monitoring a consumer network usage pattern on a network at a consumer device for downloading the selected media content;
continuously monitoring a provider network usage pattern at a network of the content provider;
determining a download time for the selected media content based on:
the consumer network usage pattern;
the provider network usage pattern;
an amount of network bandwidth available between the content provider and the consumer device; and
the selected viewing time; and
initiating a download of the selected media content at the determined download time, wherein the selected media content contains digital rights management features.

13. The method of claim 12, wherein the selected viewing time is at least 24 hours after selecting the selected media content.

14. The method of claim 12, wherein the download time comprises a plurality of download times.

15. The method of claim 12, wherein the continuously monitored network usage pattern comprises a relatively low activity of the provider network and a peak activity of the provider network, wherein the relatively low activity represents less than fifty percent of the peak activity.

16. The method of claim 12, wherein the machine learning comprises one of:
a rule-based logic system;
a neural network;
a statistical classifier;
a naive Bayesian network;
multi-linear regression;
non-linear regression; and
ensemble learning.

17. A system comprising:
a display output that provides video data to a display;
a memory to store machine readable instructions;
a processing unit to access the memory and execute the machine readable instructions, the machine readable instructions comprising:
a graphical user interface (GUI) to:
select media content in a media library of a content provider in response to user input; and
select a viewing time for the selected media content;
a scheduling agent to:
continuously monitor a consumer network usage pattern on a network at a consumer device for downloading the selected media content;
continuously monitor a provider network usage pattern on a network at the content provider;
determine an available network bandwidth between the content provider and the system; and
determine a download time for the selected media content, wherein the download time is based on:
the consumer network usage pattern,
the provider network usage pattern,
the selected viewing time,
the available network bandwidth between the content provider and the system; and a download agent to initiate a download of the selected media content at the determined download time, wherein the selected media content contains digital rights management features.

18. The system of claim 17, wherein the selected media content has a resolution of full high definition, ultra-high definition or quad ultra-high definition.

\* \* \* \* \*